United States Patent [19]
Rostoker et al.

[11] Patent Number: 6,111,863
[45] Date of Patent: Aug. 29, 2000

[54] METHOD AND APPARATUS FOR THE DYNAMIC ALLOCATION OF SIGNAL BANDWIDTH BETWEEN AUDIO, VIDEO AND DATA SIGNALS

[75] Inventors: Michael D. Rostoker, Boulder Creek; John Daane, Saratoga; Sandeep Jaggi, San Jose, all of Calif.

[73] Assignee: LSI Logic Corporation, Milpitas, Calif.

[21] Appl. No.: 08/580,577

[22] Filed: Dec. 29, 1995

[51] Int. Cl.[7] .................................................. H04J 3/16
[52] U.S. Cl. ..................... 370/329; 370/412; 370/468; 370/522; 370/477; 348/14
[58] Field of Search ..................... 370/455, 444, 370/431, 310, 329, 330, 443, 313, 322, 343, 348, 433, 435, 437, 230, 235, 412, 465, 468, 477, 473, 349, 522, 335, 337; 348/14, 17, 19, 387, 388; 455/512, 527, 557

[56] References Cited

U.S. PATENT DOCUMENTS

| | | | |
|---|---|---|---|
| 4,816,820 | 3/1989 | Davis | 340/825.44 |
| 5,132,966 | 7/1992 | Hayano et al. | 370/79 |
| 5,168,356 | 12/1992 | Acampora et al. | 358/133 |
| 5,313,467 | 5/1994 | Varghese et al. | 370/94.1 |
| 5,343,513 | 8/1994 | Kay et al. | 379/59 |
| 5,359,644 | 10/1994 | Tanaka et al. . | |
| 5,379,279 | 1/1995 | Backof et al. | 455/527 |
| 5,389,965 | 2/1995 | Kuzma . | |
| 5,491,507 | 2/1996 | Umezawa et al. . | |
| 5,550,754 | 8/1996 | McNelly et al. . | |
| 5,585,850 | 12/1996 | Schwaller . | |
| 5,592,470 | 1/1997 | Rudrapatna et al. | 370/320 |
| 5,621,463 | 4/1997 | Lyons et al. | 348/387 |
| 5,627,581 | 5/1997 | Kondo . | |
| 5,684,794 | 11/1997 | Lopez et al. | 370/337 |

*Primary Examiner*—Chau Nguyen

[57] ABSTRACT

A wireless communication unit for a wireless communication system transmits and receives video, audio and data signals within an RF bandwidth. The RF bandwidth is allocated among the video, audio and data signals to allow the video, audio and data signals to fit within the RF bandwidth. The allocation is performed by buffering the signals, making priority assignments to each of the buffered signals, and transmitting the buffered signals according to the priority assignments. The transmitted signals occupy the RF bandwidth in portions specified by the priority assignments. The priority assignments can be changed during a communication link. The subscriber unit receives a transmission header from another party on the communication link, which may include a request by the other party to change the priority assignments. If such a request is received, the subscriber unit automatically changes the priority assignments in response to the request. The communication unit is applicable to subscriber units and base stations. One such subscriber can be a cellular telephone having full-motion video capability.

21 Claims, 3 Drawing Sheets

METHOD AND APPARATUS FOR THE DYNAMIC ALLOCATION OF SIGNAL BANDWIDTH BETWEEN AUDIO, VIDEO AND DATA SIGNALS

BACKGROUND OF THE INVENTION

The invention relates in general to wireless communication systems and in particular to an RF communication system for receiving and transmitting audio, video and data signals.

Today, wireless data solutions are enabling changes of great scope and depth in our society. Indeed, the wireless information revolution has the potential to democratize the information age like never before. Remotely accessible computers and data systems are becoming more and more available, putting us all on the verge of a world where an unlimited amount of information will be available anywhere, anytime.

Wireless data capabilities are also improving the productivity and accessibility of professionals in the field. The ability to send and receive information over airwaves instead of copper wires is liberating the professionals from their offices, giving them immediate access to databases and streamlining every aspect of their operations. Already, notebook computers equipped with advanced wireless communications software and radio frequency modems have enabled the formation of "virtual offices," offices that are removed from company headquarters. Now, a market analysts can track the stock market in his car while sitting in traffic during his commute to work. An engineer, instead of sitting in his office, can work on a CAD file from the pool side of his home.

The explosion of wireless data communication has been fueled by advance in semiconductor technology and software. These advances have allowed audio and data signals to be transmitted over digital networks in digital language, the language of computers.

Digital and mixed signal systems offer many advantages over old-fashioned analog systems. One important advantage is the ability of digital systems to transmit and receive more information at higher rates. Whereas analog systems are limited to transmitting audio at a rate of 64 Kbps, digital systems can compress audio transmissions and transmit eight times as much information at the same rate. Moreover, faster processors have allowed digital systems to transmit bits at ever increasing rates. By taking advantage of the ability to transmit information more accurately and at higher rates, significant savings have been realized in both switching capacity and ongoing line costs.

Additional advantages have been realized through the use of multiple access techniques such as Time Division Multiple Access ("TDMA") and Code Division Multiple Access ("CDMA"). These techniques allow for multiple users to access a single bandwidth. They also allow for audio and data signals transmitted by a single user to be intermingled. These techniques make better use of scarce airwave space.

A recent development in the wireless information revolution has been the transmission of video signals over the airwaves. This is now being done in the television industry, as near-perfect images are being transmitted digitally on the Ku-band from satellites to home-mounted dishes as small as eighteen inches in diameter. A similar development is occurring in the cellular telephone industry as efforts are being made to add video capability to cellular telephones.

Before quality video capability can be added to cellular telephones, a problem arising from bandwidth limitation must be overcome. Current cellular telephone systems operate on a frequency of 900 MHZ. Yet even with the use of sophisticated compression routines, the bandwidth is not wide enough to transmit the enormous amount of video and audio information that is required for quality motion pictures. Bandwidth limitation may not be a problem for high frequency satellite transmissions, but it is a problem for the comparatively low frequency radio transmissions.

Therefore, it is an objective of the present invention to overcome the above-mentioned bandwidth limitation problem and provide video communication capability to a radio frequency communication system.

SUMMARY OF THE INVENTION

The bandwidth limitation problem is overcome by a wireless communication unit comprising at least one digital transceiver operable to transmit and receive a plurality of data signals over a fixed bandwidth; and a controller operable to dynamically allocate the fixed bandwidth among the plurality of signals. The dynamic allocation is performed by making priority assignments to the plurality of signals and transmitting the plurality of signals according to the priority assignments.

The fixed bandwidth can be an RF bandwidth. The plurality of signals can include video, audio and data signals.

The communication unit can be a subscriber unit or a base station. A system employing the communication units can utilize a multiple access technique such as Time Division Multiple Access or Code Division Multiple Access. One embodiment of the communication unit is a video telephone.

DETAILED DESCRIPTION OF THE PREFERRED EMBODIMENTS

Figure 1:
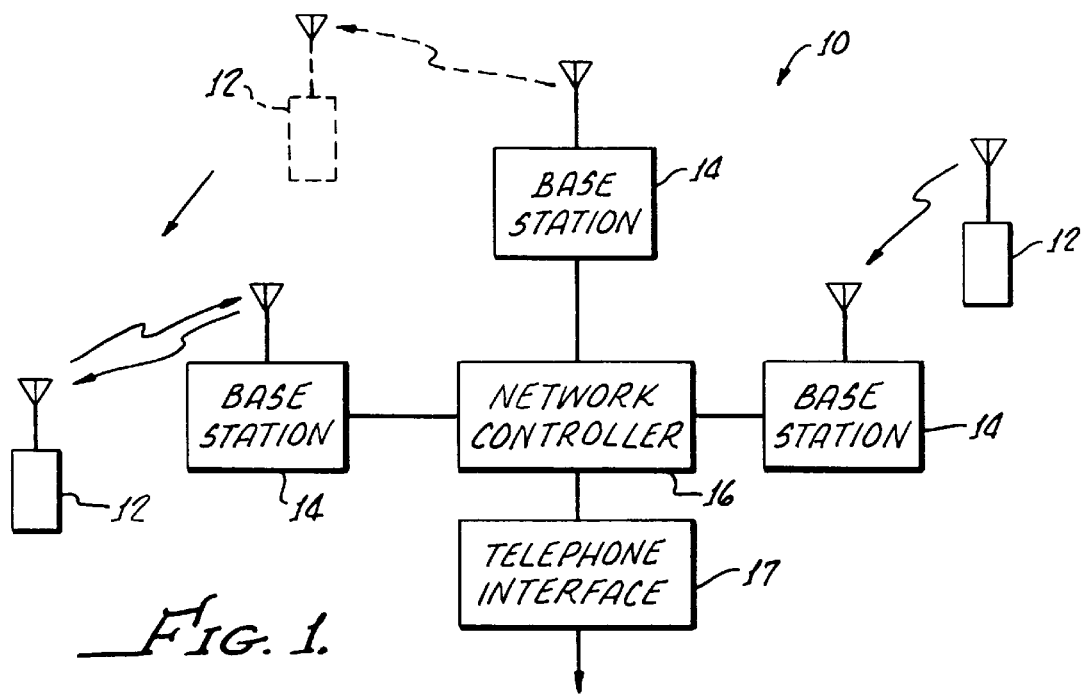
FIG. 1 is a schematic illustration of a cellular communication system.

FIG. 1 shows a cellular communication system 10 including a plurality of subscriber units 12. The subscriber units 12 can include mobile units such as hand held telephones and stationary units such as desktop computers. The system 10 also includes a number of base stations 14 that allow the subscriber units 12 to communicate with each other and with other communication devices in other networks.

The system 10 covers a geographical area that is divided into a grid of cell sites, with each cell site containing at least one base station 14. Each base station 14 communicates with all subscriber units 12 in its cell site via radio frequency ("RF") signals. One frequency is used for transmission from the base station 14 to the subscriber units 12 (the "downlink" frequency), and a different frequency is used for transmission from the subscriber units 12 to the base station 14 (the "uplink" frequency). The system 10 employs "frequency reuse" to allow more than one base station 14 to operate at the same radio frequency. Each cell site is made large enough so that RF signals crossing a cell site are attenuated in substantial amount so that they are perceived as lower level noise by base stations in distant cell sites. Frequency isolation occurs in free space because the RF signals are inherently attenuated in proportion to the square of the distance from the radiating source. Isolation is furthered by interference arising from man-made and natural structures.

One or more frequencies are set aside for setting up a communication link or call between the base station 14 and a subscriber unit 12.

The base stations 14 are interlinked with a network controller 16 via a distribution facility such as a dedicated copper wire or fiber optic network, a radio communication link, or a satellite link. The satellite link provides the highest system capacity. The network controller 16, in turn, provides access to existing wireline telephone networks 17. Each base station 14 determines the received signal strength of each call in progress, and forwards this information to the network controller 16. The network controller 16 uses advanced processing technology to keep track of all calls between the subscriber units 12 and base stations 14. The network controller 16 also uses the signal strength information from each base station 14 to determine when a call should be "handed off" from the base station in one cell site to the base station in another cell site. Hand-off allows communication to be maintained with a subscriber unit 12 as the subscriber unit 12 roams from cell site to cell site.

Video, audio and data are transmitted over the airwaves as digital signals between the subscriber units 12 and base stations 14. Sources of video, audio and data are not limited to other subscriber units 12 in the system 10. Since the base stations 14 are linked to telephone networks, data can be provided over wired networks by sources such as private faxes and corporate computers containing commercial databases. Audio can be provided over wired networks by analog telephones, personal computers and even radios. Full-motion video can be provided by direct broadcast satellites and Very Small Aperture Terminals, and by computers over fiber optic and ISDN networks.

Within a cell site, each frequency bandwidth is "shared" by all subscriber units 12, either through a Time Division Multiple Access ("TDMA") technique or a Code Division Multiple Access ("CDMA") technique. The TDMA technique divides up the total bandwidth into a predetermined number of time slots, with each subscriber unit 12 being allocated a specific time slot. One of the time slots contains an imbedded control channel. Each base station 14 continuously transmits time division multiplexed bit streams to the subscriber units 12 on the downlink frequency, with each subscriber unit 12 responding by transmitting bursts on the uplink frequency. Even if a base station 14 is not communicating with a subscriber unit 12, a dummy time slot transmission is sent.

The CDMA technique, instead of dividing up the total bandwidth into time slots, spreads the signal of each subscriber unit 12 across the entire bandwidth. Although each subscriber unit 12 generally occupies the entire bandwidth designated by the base station 14, it utilizes only a portion of the power available to the base station 14. The information-bearing signal is multiplied by a high bandwidth, high frequency digital spreading signal, which expands the narrow bandwidth information-bearing signal into a broad spread signal covering the entire transmission bandwidth. The spreading signal uses quasi-orthogonal bit sequences of period Tc, referred to in the art as chips. The chip sequence causes the cross-correlation function between subscriber units 12 to be small, in which event the subscriber units 12 are quasi-orthogonal to each other. The chip sequence can be generated or chosen so that a predetermined or unique chip sequence is assigned to a specific subscriber unit 12 each time the subscriber unit 12 starts a call. This, of course, requires the network controller 16 to maintain a central log or listing of all user chip sequence assignments.

Figure 2:
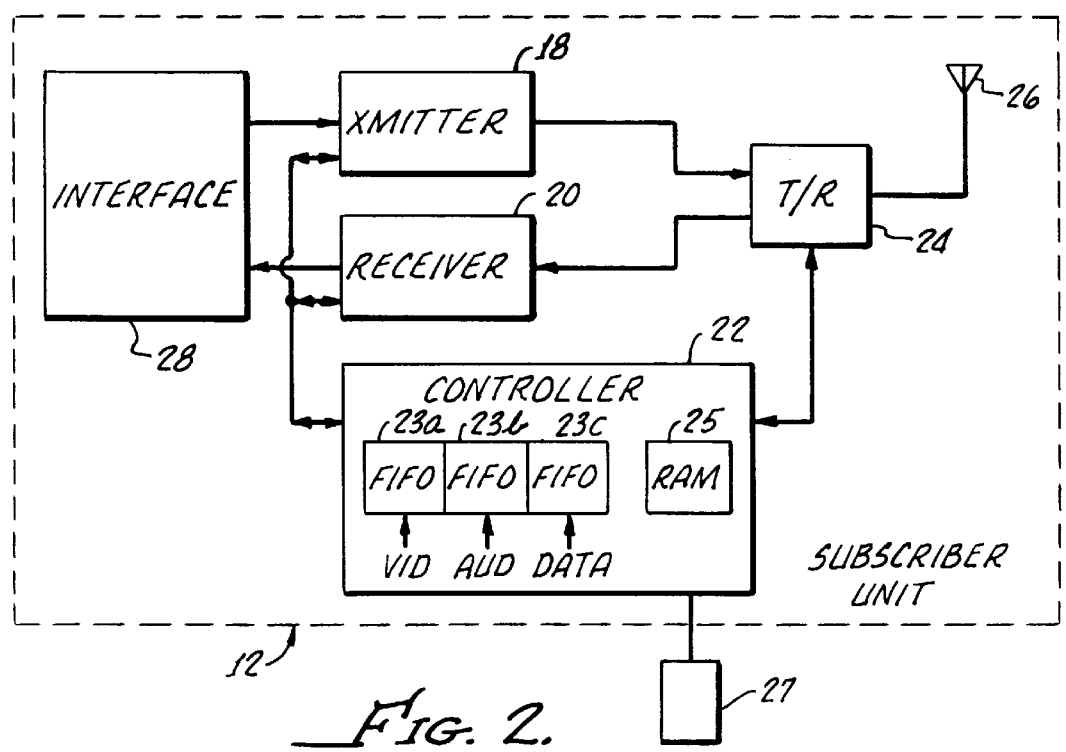
FIG. 2 is a block diagram of a subscriber unit according to the present invention.

FIG. 2 shows the subscriber unit 12 for the cellular system 10. The subscriber unit 12 includes a transmitter 18, receiver 20, controller 22, T/R module 24 and a high efficiency antenna 26. The controller 22 defines and implements the protocol for the subscriber unit 12. That is, it defines the convention through which the subscriber unit 12 can communicate with the base station 14. The controller 22 decodes the header of each base station transmission and executes a protocol structure which controls timing and decision making logic instructions (e.g., timing, message slot selection, T/R control) and other well known operations. Prior to a call setup, the subscriber unit 12 monitors air time, activity, account numbers, and protocol of the base station 14 to determine whether it can access the system 10. When the subscriber unit 12 is ready to make a call, or when a call is transmitted to it, the subscriber unit 12 establishes a setup channel with a proximate base station 14. During call setup the base station 14 specifies the unique time slots and uplink/downlink frequencies for the subscriber unit 12 to transmit and receive the call.

In addition to those well known operations, the controller 22 allocates the RF bandwidth among the audio, video and data signals. Video, audio and data signals to be transmitted are stored in a video buffer 23$a$, an audio buffer 23$b$ and a data buffer 23$c$. Each buffer 23$a$, 23$b$ and 23$c$ is a queue, a first-in, first-out (FIFO) buffer. The signals are initially assigned equal priority ($\frac{1}{3}$, $\frac{1}{3}$, $\frac{1}{3}$) of transmission. The priority assignments are stored in computer memory such as Random Access Memory (RAM) 25. Equal priority assignments means that all three signals occupy equal portions of the RF bandwidth during a transmission by the subscriber unit 12. Thus, for each transmission, one third of the RF bandwidth is occupied by the video signal, one third of the RF bandwidth is occupied by the audio signal, and the remaining third of the bandwidth is occupied by the data signal. The video, audio and data signals could be transmitted in sequence, or they could be interleaved.

The priority assignments can be changed. If, for example, the priority assignments of the video, audio and data signals are changed to 1, 0 and 0, the video signal is transmitted over the entire RF bandwidth until the video buffer 23$a$ is empty. After the video buffer 23$a$ is emptied, the audio and data signals are transmitted. If the priority assignments of the audio and data signals are equal, each will occupy one-half of the RF bandwidth during transmission. If the video buffer 23$a$ receives additional video, the transmission of the audio and data signals is stopped and the video signal is transmitted until the video buffer 23$a$ is emptied. Then, transmission of the audio and data signals is resumed.

If additional data and audio signals must be transmitted while the video signal is being transmitted, the audio and data signals are stored in the audio and video buffers 23$b$ and 23$c$. If the audio and data buffers 23$b$ and 23$c$ become full, the audio and data already stored in the buffers 23$b$ and 23$c$ are pushed out in order to make room for new signals. Thus, audio and data is lost at the expense of high quality video.

The priority assignments and, therefore, bandwidth allocation are changed in response to a request from another party on the communication link. If the other party desires a higher quality audio, it sends an appropriate request to the subscriber unit 12. The controller 22 responds by transmitting more of the audio signal and buffering more of the video and data signals until the fidelity of the transmitted audio meets the approval of the other party (i.e., when the other party stops making requests for higher audio fidelity).

This requires a protocol that is tailored for dynamic bandwidth allocation of the video, audio and data signals. To implement this protocol, four bits in a transmission header are dedicated to the request. Two of the bits indicate whether the transmission priority should be increased, decreased, not changed or reset to preset assignments. The other two bits indicate which signal, whether the video signal, audio signal or data signal, should be affected by an increase or decrease. On the transmitting end, the request can be input to the controller 22 by means such as a keypad 27. The controller 22 sets the four bits in the transmission header accordingly.

On the receiving end, the controller 22 constantly checks for requests from the other party by monitoring the transmission headers received during the communication link. When the subscriber unit 12 receives a request, its controller 22 updates the appropriate priority assignments for the audio and video signals. The signals are buffered and the buffers 23a, 23b and 23c are emptied in accordance with the priority assignments. The output of the buffers 23a, 23b and 23c is a serial stream, which is supplied to the transmitter 18.

The transmitter 18 compresses the audio and video signals at rates that are initially preset. However, the rates can be adjusted by the controller 22 to reduce the amount of information being buffered. Following compression, audio, video and data signals are formatted, transported and multiplexed together with the transmission header (which includes the four bit request) to form a composite signal. The composite signal is further processed by the transmitter 18 into either a spread spectrum signal or a time division multiplexed signal, depending upon whether CDMA or TDMA is being used by the system 10. The encoded signal is used to modulate a carrier signal. The modulated carrier signal is sent to the antenna 26 through the T/R module 24. For subscriber units 12 that do not have a video capability, only audio and data signals are multiplexed with the transmission header to form the composite signal, with compression being performed on the audio signal only.

RF signals received on the antenna 26 are sent to the receiver 20 through the T/R module 24. The receiver 20 separates the incoming signal into four demodulated signals: a compressed video signal, a compressed audio signal, a data signal and a transmission header. The transmission header is sent to the controller 22 and monitored for a request to change the priority assignments. The compressed video signal, compressed audio signal and the data signal are unformatted. The compressed signals are then decompressed using compression rates embedded in the compressed signals. The decompressed signals, along with the unformatted data signal, are forwarded to the appropriate interfaces 28 in the subscriber unit 12.

The types of interfaces 28 utilized by the subscriber unit 12 are partly dependent upon whether the unit 12 is stationary or mobile. For a mobile subscriber unit 12 such as a cellular telephone, the interfaces 28 must fit within a standard cellular phone case. Audio signals sent from the transmitter 18 and received by the receiver 20 can be handled by microphones, speakers and their associated circuitry in the conventional manner. Data signals supplied to the transmitter 18 and received by the receiver 20 can be transferred in and out of the cellular telephone through a serial or parallel port on the case. Video signals received by the cellular telephone can be synchronized with the audio signals and displayed on a small flat panel display mounted to a surface of the cellular telephone's case, or they could be supplied to a CRT through a parallel port on the case. Video signals supplied to the cellular telephone can be provided on a parallel or serial port on the case. For example, an automobile can be equipped with a camera and video capture card that would supply the video signal to the port. It is even possible to furnish the cellular telephone with an internal CCD, optical assembly and video processor for providing video images directly to the transmitter 18.

Stationary units, especially desktop personal computers, can be equipped with more elaborate interfaces. Audio signals can be supplied to a resident sound card by a hand held microphone and they can be outputted from the sound card to a speaker system. Data signals can be supplied to the transmitter 18 directly from computer memory, the computer's motherboard or from communications ports, and data from the receiver 20 can be saved in computer memory, forwarded to a printer or displayed on a CRT. Video signals can be supplied by a hand held camera and a resident video capture card, with the video image from the camera being quantized by the video capture card in both the spatial domain and the intensity domain. Video signals received by the computer can be saved in computer memory or displayed directly on the CRT.

A desktop computer having a "PENTIUM" processor or a more powerful processor can be adapted to operate as a subscriber unit 12 with the addition of only a single card. The transmitter 18, receiver 20, T/R module 24 and interfaces 28 are mounted to the single card, which is inserted into the backplane of the computer. The transmitter 18 and receiver 20, which perform analog and digital signal processing, are of mixed signal ASIC designs. It is not necessary to add a controller 22 to the card; only a Read-Only Memory (ROM) need be mounted. Instructions for the controller are stored in the ROM, and the instructions are executed by the computer's microprocessor.

Figure 3:
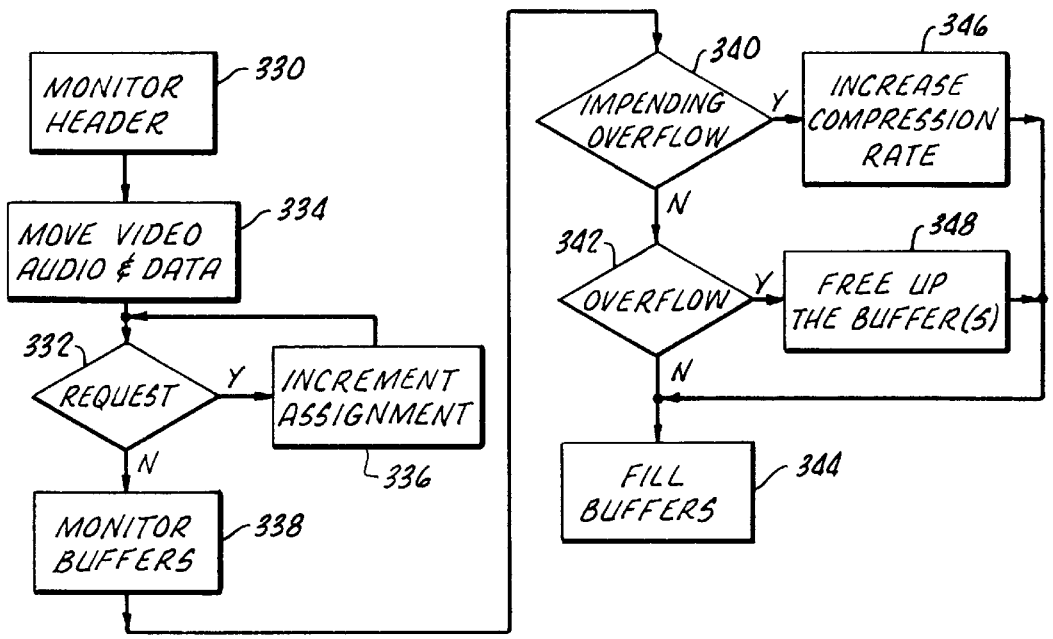
FIG. 3 is a flowchart of steps for the dynamic allocation of an RF bandwidth among video, audio and data signals, the steps being performed by the subscriber unit shown in FIG. 2.

FIG. 3 shows the steps 300–348 that are performed by the controller 22 for the dynamic allocation of the RF bandwidth among the video, audio and data signals. The controller 22 monitors each transmission header for a request to change priority assignments (step 330). If no request is received (step 332), the controller 22 moves the video, audio and data from their buffers 23a, 23b and 23c to the transmitter 18 in accordance with the priority assignments (step 334). Thus, if the priority assignments are equal, all three signals are equally sent to the transmitter 18.

If a request is made (step 332), the controller 22 incrementally changes the priority assignment of the specified signal by an increment of, say, 1%, until the request has stopped (step 336). In the meantime, the controller 22 is moving the audio, video and data from their buffers 23a, 23b and 23c to the transmitter 18 in accordance with the newly assigned priorities (step 334).

The controller 22 also monitors the buffers 23a, 23b and 23c to detect overflows (step 338). If there is no danger of an overflow (steps 340 and 342), the controller 22 continues to fill the buffers 23a, 23b and 23c (step 344). If a particular buffer 23a, 23b or 23c is in danger of overflowing (step 340), the controller 22 increases the rate at which the transmitter 18 compresses the corresponding signal (step 346). This allows the particular buffer 23a, 23b or 23c to be emptied faster. Once the danger of overflow has subsided, the compression rate is reset. If overflow occurs, however, the information in the particular buffer 23a, 23b or 23c must be overwritten (step 348). Information stored first in the particular buffer 23a, 23b or 23c is pushed out to make room for new data.

Figure 4:
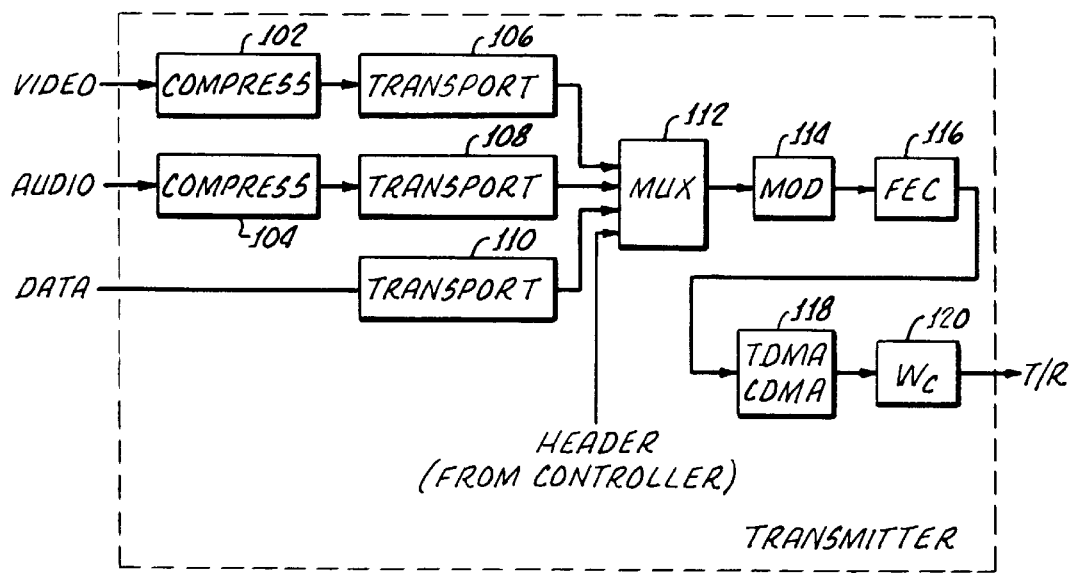
FIG. 4 is a block diagram of a transmitter for the subscriber unit shown in FIG. 2.

FIG. 4 shows the functions performed by the transmitter 18. The digital video signal is compressed according to an algorithm that supports variable rate compression (block 102). The digital audio signal is also compressed according to an algorithm that supports variable rate compression (block 104). The video and audio signals are normally at rates that are preset, subject to change by the controller 22.

The compressed video signal is broken up into video transport packets (block 106), and the audio signal is broken up into audio transport packets (block 108). The data signal, although uncompressed, is broken up into data transport packets (block 110). Each transport packet includes a header and data portion. In the case of the compressed signals, the header will indicate whether the compression rates are stored in the first few bytes of the data portion.

Apparatus and methods for compressing the audio and video signals are disclosed in U.S. patent application Ser. No. 08/580,547, filed Dec. 29, 1995 now U.S. Pat. No. 5,784,572 and incorporated herein by reference. The apparatus supports variable rate compression and utilizes multiple compression algorithms. During a communication link, for example, the apparatus can use an MPEG-1 algorithm for both audio and video compression. During another communication link, the same apparatus can use an MPEG-2 algorithm for video compression and Dolby AC3 for audio compression.

The audio, video and data transport packets are multiplexed together with the transmission header to form a composite signal (block 112). The transmission header, which is generated by the controller 22, includes the four bits that request the other party to change the priorities of the video, audio and data signals being transmitted by that party.

The composite signal is then modulated using phase shift keying (PSK) modulation, frequency shift keying (FSK) modulation, or any other type of modulation suitable for a TDMA or CDMA system (block 114). The PSK modulation may be any of binary phase shift keying (BPSK) modulation, quadrature phase shift keying (QPSK) modulation, M-ary phase shift keying (MPSK) modulation where M is larger than four, or variants of differential phase shift keying (DPSK) modulation.

Following modulation is forward error correction (block 116). Signals to be transmitted are encoded by coding schemes such as Linear Predictive Coding (LPC) or Continuously Variable Sloped Delta (CVSD) modulation. Actual data bits forming the input signal are interleaved with additional bits for ascertaining, or monitoring errors and providing for correction.

If the system uses a CDMA technique, the digitally encoded information signal is mixed with a spreading chip sequence, which is assigned to the subscriber unit (block 118). The chip sequence is sent by the subscriber unit to the base station 14 as part of the call setup. It is desirable to spread the communication signal to cover the entire allocated bandwidth where possible and achieve a high processing gain.

The mixed broad band spread information signal is then mixed with a carrier frequency to produce the communication signals to be transmitted (block 120). The specific frequency used is predetermined by the spectral allocation for the communication system 10. The modulated signal is sent to the T/R module 24, which transmits the signal under the control of the controller 22.

If the system uses a TDMA technique, the digitally encoded information signal is used to modulate a carrier frequency only during the allocated time slot (blocks 112 and 114). The resulting burst is transmitted by the T/R module.

Figure 5:
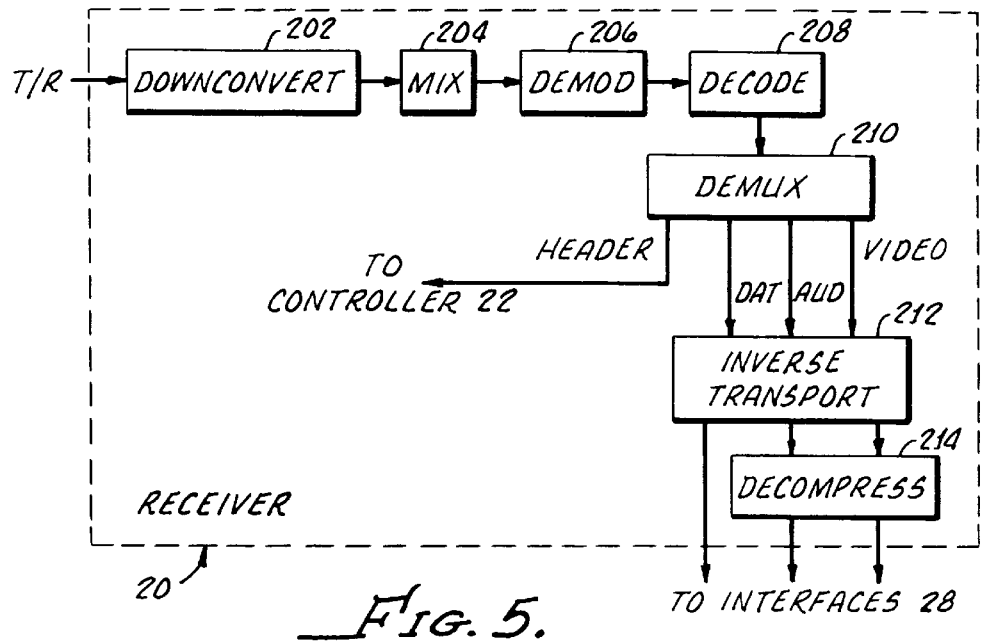
FIG. 5 is a block diagram of a receiver for the subscriber unit shown in FIG. 2.

FIG. 5 shows the functions performed by the receiver 20. The receiver 20 performs low noise amplification on the signal received from the antenna and T/R module and down converts the amplified signal into an intermediate frequency (IF) signal (block 202). Gain control of the IF signal is performed and the gain-controlled IF signal is mixed to form a baseband signal (block 204). The baseband signal is then locked onto and demodulated by breaking it into its in-phase (I) and quadrature (Q) components, which are converted into a digital signal (block 206). The digital signal is deinterleaved and decoded at a predetermined decoding rate by a convolutional decoder such as a Viterbi algorithm decoder (block 208). The decoded signal is then demultiplexed into a transmission header and video, audio and data transport packets (block 210). The transmission header is supplied to the controller 22 and the audio, data and video signals are sent to an inverse transport processor (block 212). The compressed audio and video signals are thereafter decompressed using the audio and video compression rates embedded in the data portion of the transport packet (block 214). The decompressed video and audio signals are synchronized (if corresponding audio is transmitted) and then forwarded, along with the unformatted data signal, to the appropriate interfaces 28.

Figure 6:
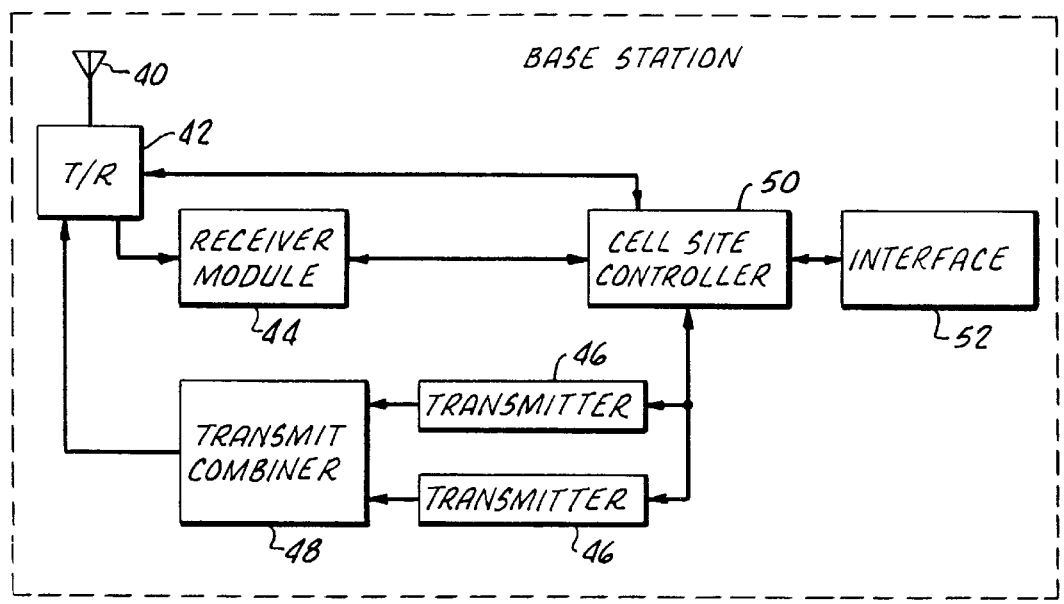
FIG. 6 is a block diagram of a base station according to the present invention.

FIG. 6 shows the base station 12 for the cellular system 10. Signals received by an antenna 40 are supplied to a receiver module 44 via a T/R module 42. For a CDMA system, the receiver module 44 includes a power splitter which sends the incoming signal to a plurality of receivers, each of which handles a specific communication link. Thus, each base station 14 for a CDMA system will employ as many receivers as communication links it is expected to establish at a given time. All receivers for the CDMA function in substantially the same manner as the receiver 20 shown in FIG. 5, except that they employ narrower band filters and timing loops instead of pilot tracking circuitry. For a TDMA system, the receiver module 44 contains a single receiver that functions in substantially the same manner as the receiver shown in FIG. 5, except that it includes a demultiplexer and associated circuitry for forwarding the received bursts onto separate communication links.

Digital audio, data and video signals are supplied to a plurality of transmitters 46, each of which is dedicated to a specific communication link. The modulated carrier signals from the various transmitters 46 are combined by a transmit combiner 48. In the case of the TDMA system, the bursts from the transmitters 46 are combined at their selected time slots to provide a continuous stream of time-division multiplexed information. In the case of the CDMA system, the spread spectrum signals are combined to provide a composite spread spectrum signal. The combined transmit signal from the transmit combiner 48 is then supplied to the antenna 40 through the T/R module 42.

The base station 14 is controlled by a cell site controller 50 in the same manner that a subscriber unit 12 is controlled by its controller 22, except that the cell site controller 50 directs the base station 14 to communicate with all of the subscriber units 12 on all of the communication links. The cell site controller 50 also determines signal strength information necessary for a hand-off decision, and passes the information to the network controller 16.

The base station 14 also includes an interface 52 for sending the video, audio and data signals in digital form to the network controller 16. The network controller 16 places the audio, video and data signals on a telephone network, sends the signals to other base stations, places them on a satellite link, etc. If the base station 14 has direct access to an existing telephone network, the interface 52 would include data-to-audio decoders for sending analog audio signals over the network and audio-to-data encoders for receiving the analog audio signals.

Thus disclosed is an RF communication system that overcomes the problem of bandwidth limitation associated with the transmission of audio and high quality video signals. The problem is overcome by dynamically allocating the bandwidth among the audio and video signals.

Further disclosed is a protocol for the transmission of audio and video signals. Protocols for current TDMA and CDMA systems are not optimized for allocating the RF bandwidth during a communication link.

Still further disclosed is a cellular telephone having quality full-motion video capability.

It is understood that various changes and modifications may be made without departing from the spirit and scope of the invention. It is also understood that use of the invention is not limited to CDMA and TDMA communication systems, but can be applied to any other type of narrow bandwidth communications system. Accordingly, the present invention is not limited to the precise embodiment described hereinabove.

What is claimed is:

1. A wireless system for the communication of video, audio and data signals over an RF bandwidth, comprising:
    a plurality of subscriber units operable to allocate the RF bandwidth among the video, audio and data signals by making priority assignments of transmission to the video, audio and data signals;
    a plurality of base stations covering a geographical area divided into a plurality of cell sites, each base station being operable to establish RF communications links with the subscriber units in its cell site; and
    a network controller connected to the plurality of base stations;
    wherein each subscriber unit receives a plurality of transmission headers during a communication link, each transmission header including a number of bits indicating whether a request to change the priority assignments between the video, audio and data signals has been made.

2. The system of claim 1, wherein the number of bits indicate whether a priority assignment of one of the signals should be increased, decreased or unchanged.

3. The system of claim 1, wherein the transmission header includes four bits for indicating whether a priority assignment of one of the signals should be increased, decreased or unchanged.

4. The system of claim 1, wherein at least one subscriber unit comprises:
    a digital transceiver operable to transmit and receive a data signal and compressed video and audio signals over the RF bandwidth; and
    a controller operable to dynamically allocate the RF bandwidth among the video, audio and data signals prior to transmission, the dynamic allocation being made in response to the transmission header of a received signal.

5. The system of claim 1, wherein at least one base station comprises:
    at least one digital transceiver operable to transmit and receive data signals and compressed video and audio signals over the RF bandwidth; and
    a controller operable to dynamically allocate the RF bandwidth among the video, audio and data signals prior to transmission, the dynamic allocation allowing the video, audio and data signals to be transmitted within the RF bandwidth.

6. A mobile video telephone, comprising:
    a digital transceiver operable to transmit and receive a data signal and compressed video and audio signals over an RF bandwidth;
    a controller operable to dynamically allocate the RF bandwidth among the video, audio and data signals, the dynamic allocation being performed by making priority assignments to each of the video, audio and data signals and transmitting the video, audio and data signals according to the priority assignments; and
    a display for displaying a video signal received by the transceiver;
    wherein the controller performs the steps of:
        buffering the video, audio and data signals to be transmitted;
        making the priority assignments to each of the buffered signals;
        supplying the buffered signals to the transceiver such that the buffered signals, when transmitted, occupy the fixed bandwidth in portions specified by the priority assignments.

7. The video telephone of claim 6, wherein the transceiver includes:
    an antenna;
    a T/R module coupled to the antenna;
    a receiver having an input coupled to the T/R module; and
    a transmitter having an output coupled to the T/R module.

8. The video telephone of claim 7, wherein the receiver includes:
    a demodulator for demodulating an incoming signal from the T/R module;
    a demultiplexer for separating the demodulated signal into a transmission header and video, audio and data signals, the transmission header being supplied to the controller;
    a first decompressor for decompressing the video signal according to a rate embedded in the video signal; and
    a second decompressor for decompressing the audio signal according to a rate embedded in the audio signal.

9. The video telephone of claim 7, wherein the transmitter includes:
    a first compressor for compressing the video signal to fit within a video bandwidth supplied by the controller;
    a second compressor for compressing the audio signal to fit within an audio bandwidth supplied by the controller;
    a combiner for combining the compressed video and audio signals;
    a PSK modulator responsive to an output of the combiner; and
    a carrier frequency modulator, responsive to an output of the PSK modulator.

10. The mobile video telephone of claim 6, wherein the controller performs the additional step of changing the rates of compression of select signals, whereby the transceiver increases the compression of the corresponding signals.

11. The mobile video telephone of claim 6, wherein the controller performs the additional steps of:
receiving signals including transmission headers from another party when a communication link with the other party has been established;
monitoring the transmission headers for requests to change the priority assignments; and
changing the priority assignments in response to the requests, whereby the bandwidth are allocated among the signals in accordance with the requests.

12. A wireless communication unit, comprising:
at least one digital transceiver operable to transmit and receive a plurality of signals comprising at least two from the group consisting of video signals, audio signals, and data signals;
a controller operable to dynamically allocated the fixed bandwidth among the plurality of signals, the dynamic allocation being performed by making priority assignments to each of the plurality of signals and transmitting the plurality of signals according to the priority assignments, wherein said controller supplies buffered signals to the transceiver such that the buffered signals, when transmitted, occupy the fixed bandwidth in portions specified by the priority assignments; and
a plurality of queues corresponding to the plurality of buffers, the controller buffering the plurality of signals in the queues;
wherein the controller performs the steps of:
buffering the signals to be transmitted;
making the priority assignments to each of the buffered signals;
receiving signals including transmission headers from another party when a communication link with the other party has been established;
monitoring the transmission headers for requests to change the priority assignments; and
changing the priority assignments in response to the requests, whereby the fixed bandwidth is allocated among the plurality of signals in accordance with the requests.

13. The communication unit of claim 12, wherein the priority assignments are changed incrementally until the requests have stopped.

14. The communication unit of claim 13, wherein each request occupies four bits in the transmission header.

15. A wireless communication unit, comprising:
at least one digital transceiver operable to transmit and receive a plurality of signals over a fixed bandwidth; and
a controller operable to dynamically allocate the fixed bandwidth among the plurality of signals, the dynamic allocation being performed by making priority assignments to each of the plurality of signals and transmitting the plurality of signals according to the priority assignments wherein the communication unit is a subscriber unit;
wherein the transceiver includes:
an antenna;
a T/R module coupled to the antenna;
a receiver having an input coupled to the T/R module; and
a transmitter having an output coupled to the T/R module; and
wherein the receiver further includes:
a demodulator for demodulating an incoming signal from the T/R module;
a demultiplexer for separating the demodulated signal into a transmission header and the plurality of signals, the transmission header being supplied to the controller; and
at least one decompressor for decompressing select signals of the plurality according to rates embedded in the select signals.

16. A wireless communication unit, comprising:
at least one digital transceiver operable to transmit and receive a plurality of signals over a fixed bandwidth; and
a controller operable to dynamically allocated the fixed bandwidth among the plurality of signals, the dynamic allocation being performed by making priority assignments to each of the plurality of signals and transmitting the plurality of signals according to the priority assignments wherein the communication unit is a subscriber unit;
wherein the transceiver includes:
an antenna;
a T/R module coupled to the antenna;
a receiver having an input coupled to the T/R module; and
a transmitter having an output coupled to the T/R module; and
wherein the transmitter further includes:
at least one compressor for compressing select signals of the plurality at compression rates supplied by the controller;
a combiner for combining the plurality of signals;
a PSK modulator responsive to an output of the combiner; and
a carrier frequency modulator, responsive to an output of the PSK modulator.

17. The communication unit of claim 16, wherein the transmitter further includes an encoder between the combiner and PSK modulator for generating a code division spread spectrum signal from an output of the combiner, the spread spectrum signal being supplied to the PSK modulator.

18. The communication unit of claim 16, wherein the transmitter further includes an encoder between the combiner and PSK modulator for generating a time division multiplexed signal from an output of the combiner, the time division multiplexed signal being supplied to the PSK modulator.

19. A method of communicating a plurality of signals within an RF bandwidth, comprising the steps of:
making priority assignments to each of the plurality of signals;
transmitting the plurality of signals within the RF bandwidth according to the priority assignments, wherein the transmitted signals occupy the RF bandwidth in portions specified by the priority assignments;
buffering the signals prior to the step of making the priority assignments, wherein the signals are buffered on a first-in, first-out basis;
establishing a communication link with another party;
receiving signals including transmission headers from the other party;
monitoring the transmission headers for requests to change the priority assignments; and changing the priority assignments in response to the requests, whereby the RF bandwidth is allocated among the plurality of signals in accordance with the requests.

20. The method of claim 19, wherein the priority assignments are changed incrementally until the requests have stopped.

21. A method of communicating a plurality of signals within an RF bandwidth, comprising the steps of:

making priority assignments to each of the plurality of signals;

transmitting the plurality of signals within the RF bandwidth according to the priority assignments, wherein the transmitted signals occupy the RF bandwidth in portions specified by the priority assignments;

buffering the signals prior to the step of making the priority assignments, wherein the signals are buffered on a first-in, first-out basis;

receiving a transmission;

demodulating the transmission;

separating the transmission into video, audio and data signal;

decompressing the video signal according to a rate embedded in the video signal; and decompressing the audio signal according to a rate embedded in the audio signal.

* * * * *